United States Patent [19]

Pointout et al.

[11] Patent Number: 4,644,179
[45] Date of Patent: Feb. 17, 1987

[54] ELECTRONICALLY CONTROLLED ELECTROMAGNETIC SAFETY BATTERY CUT-OUT FOR TRANSPORT OF DANGEROUS OR OTHER MATERIALS

[75] Inventors: Philippe Pointout; Jacques Pointout, both of Montlucon, France

[73] Assignee: Etudes et Commercialisation d'Appareils Nouveaux Speciaus, ECANS, France

[21] Appl. No.: 714,305

[22] Filed: Mar. 21, 1985

[30] Foreign Application Priority Data

Mar. 30, 1984 [FR] France .................................. 84 05093

[51] Int. Cl.⁴ ............................................. H02H 7/18
[52] U.S. Cl. ............................... 307/10 BP; 307/10 R; 335/131; 335/126; 361/191; 361/192
[58] Field of Search ....................... 361/191, 192, 193; 335/131, 126; 307/10 BP, 10 R

[56] References Cited

U.S. PATENT DOCUMENTS

| | | | |
|---|---|---|---|
| 2,538,581 | 1/1951 | Minch et al. | 307/10 BP |
| 3,194,920 | 7/1965 | Scheib | 335/131 |
| 4,149,093 | 4/1979 | D'Alessio et al. | |
| 4,173,031 | 10/1979 | Leichle | 361/191 |

FOREIGN PATENT DOCUMENTS

| | | |
|---|---|---|
| 0011969 | 11/1980 | European Pat. Off. . |
| 2907720 | 9/1980 | Fed. Rep. of Germany . |
| 2367341 | 5/1978 | France . |
| 2474753 | 7/1981 | France . |
| 2488041 | 2/1982 | France . |
| 2029146 | 3/1980 | United Kingdom . |

*Primary Examiner*—William M. Shoop, Jr.
*Assistant Examiner*—Shik Luen Paul Ip
*Attorney, Agent, or Firm*—Beveridge, De Grandi & Weilacher

[57] ABSTRACT

Electronically controlled battery electromagnetic cut-out breaking the main circuit and the auxiliary circuit and being intrinsically safe, characterized in that it includes a driving electromagnet (4) with a plunger core (10) of which the drive shaft (12,14) carries, by means of an insulating intermediate part (16), a central connecting part (17) intended for the breaking of the auxiliary circuit (A,D+), as well as a cross piece (18), driven by means of a spring (19) and itself carrying by means of insulating intermediate parts (22,23) two lateral connecting bars (21), returned by return springs (26), and capable of together being applied, in the energized state of the electromagnet (4), against four terminal locations (27 or 27a) in order to ensure the main single or two-pole break, the whole assembly being enclosed with the electronics (35) in a sealed case (1,33,36).

8 Claims, 10 Drawing Figures

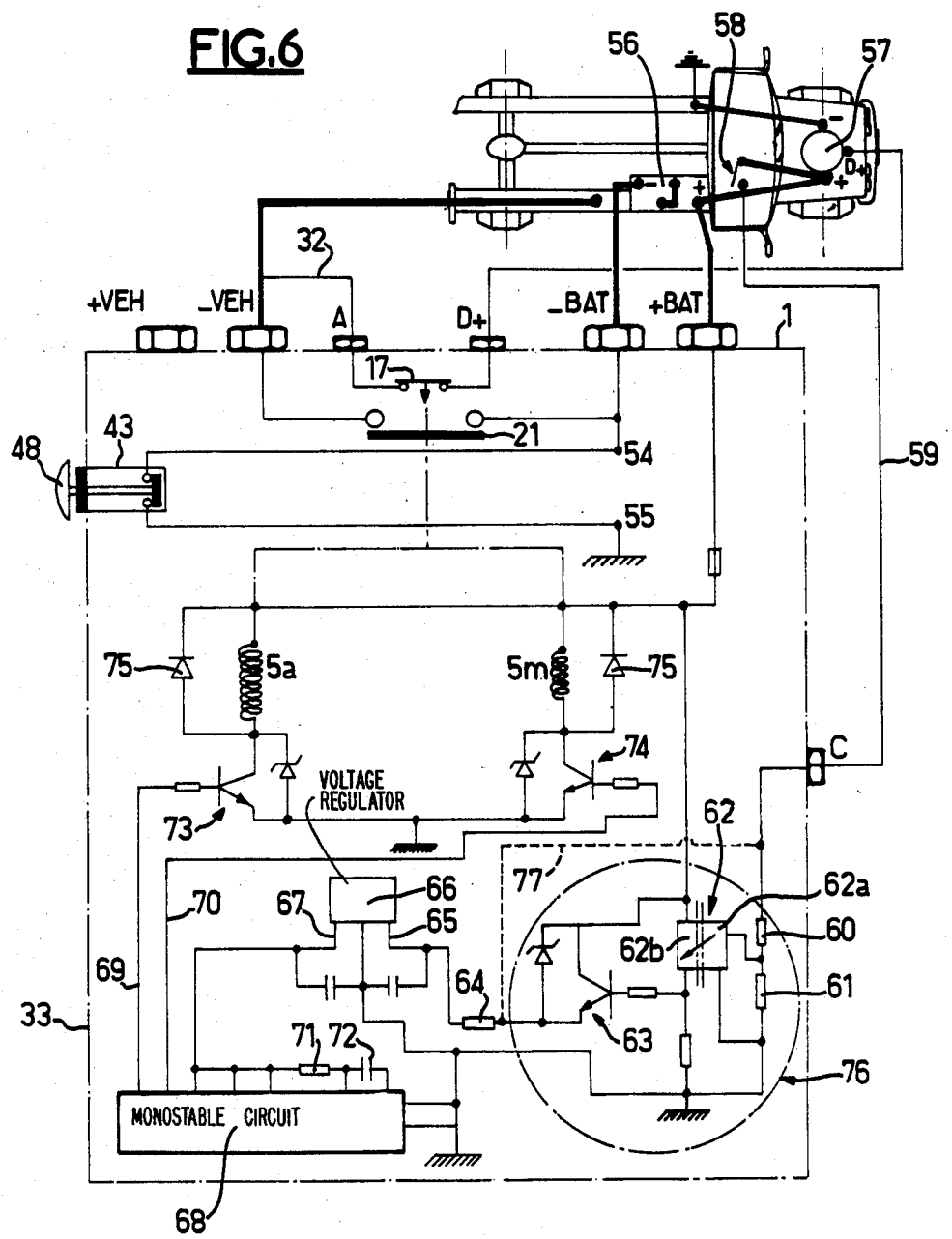

ELECTRONICALLY CONTROLLED ELECTROMAGNETIC SAFETY BATTERY CUT-OUT FOR TRANSPORT OF DANGEROUS OR OTHER MATERIALS

The invention relates to battery cut-outs on motor vehicles, particularly trucks, in general and more particularly in the case of trucks assigned to the transport of dangerous materials.

It is known that on a motor vehicle including an electric battery, a mere short-circuit can cause a fire. For this reason the use of a battery cut-out is stipulated to put the battery out of circuit during periods of nonuse or of danger. Manual control of the battery cut-out is obviously not very practical, particularly if the battery is distant from the driving controls and not very accessible. In addition, pneumatic remotely controlled battery cut-outs are considered less practical for installation by certain manufacturers, as they require pneumatic piping and air distributers. For this reason, increasing use is being made of electromagnetically controlled battery cut-outs.

In the more special case of the transport of dangerous materials, a simple spark produced for example by switching of the electrical circuit can cause an explosion of gaseous emanations. For this reason, it is stipulated that all vehicles assigned to the transport of dangerous materials likely to create an explosive atmosphere must use electrical equipment that is intrinsically safe, i.e. in particular one in which all the switching devices likely to cause a spark are enclosed under sealed covers. Also, in the case of a remotely controlled electromagnetic battery cut-out, it is stipulated that the control line should carry only a very low electric current, not exceeding 20 mA.

To this it must be added that certain standards stipulate that certain vehicles must have a two-pole battery cut-out, while for certain other vehicles a single-pole cut-out is sufficient, but generally on the negative of the battery for heavy trucks and on the positive of the battery for buses.

All these standards and numerous cases of use result in the existence on the market of a considerable number of different types of battery cut-out, all of which have a more or less specific nature, and because of this they are very costly due to the low quantities of each model produced.

The purpose of the invention is to remedy these disadvantages by producing a single basic device that largely satisfies all the standards imposed in the most difficult conditions, and which at the same time is adaptable to all cases of use by modification of the connections or by the omission of useless units during manufacture.

The invention consists, for the basic device, in grouping under the same sealed cover an electronic circuit electrically supplying a double winding, pull and hold, electromagnet which mechanically drives a central connecting part, and, by means of a crosspiece, two lateral connecting bars, insulated from each other and from the ground, and enabling the bridging in pairs of four connecting terminals arranged in an approximately square pattern and capable of performing the main switching between the vehicle positive and the battery positive and between the vehicle negative and the battery negative, respectively, the central connecting part being capable of performing the switching between two fixed pawls to ensure that the grounding pre-contact or the pre-switching off of the excitation of the alternator takes place if required.

The electronic circuit includes an optical coupler, receiving the control line from the ignition key in the cab and controlling a voltage regulator which feeds a monostable, which monostable supplies, after amplification, the pull winding during the excitation time and the hold winding during normal operation. It is also optionally possible to produce an auxiliary control by push button installed on the dashboard.

Other details of the invention will become apparent in the following description of an embodiment taken as an example and represented on the appended drawing in which.

Figure 2:
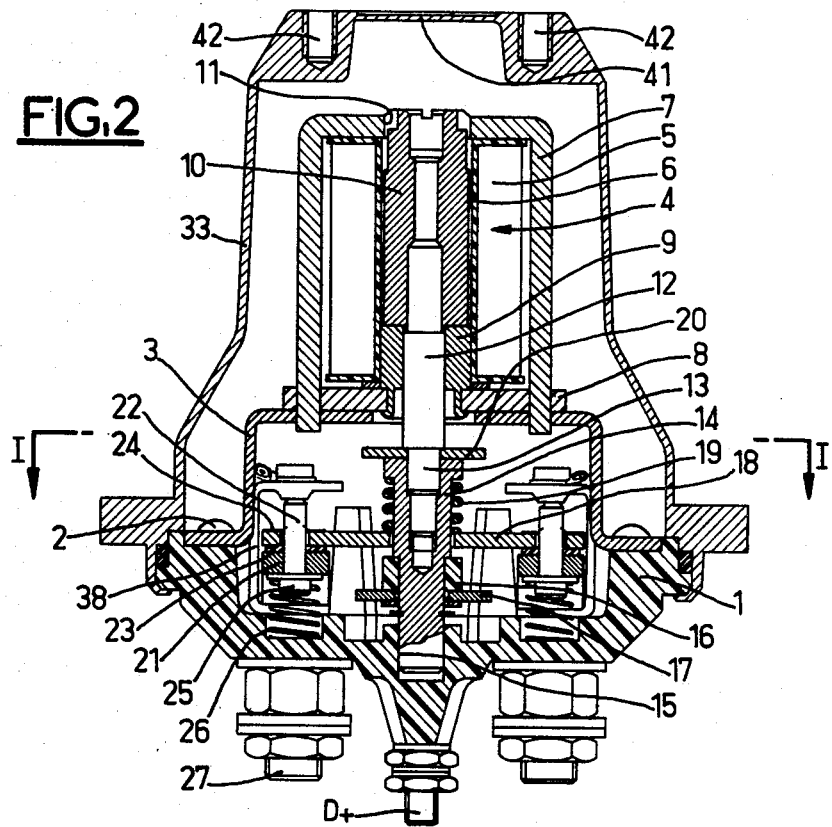
FIG. 2 is a vertical cross-section along II—II of FIG. 1.
Figure 5:
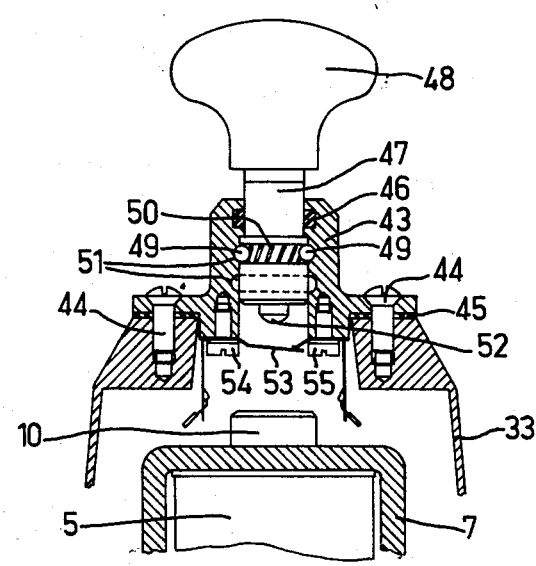
Figure 8:
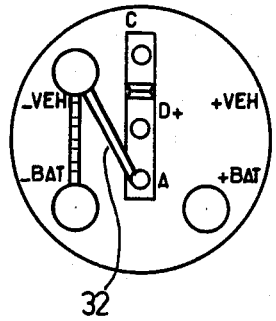
Figure 9:
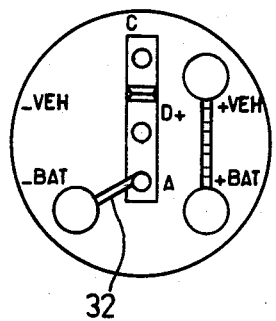
Figure 10:
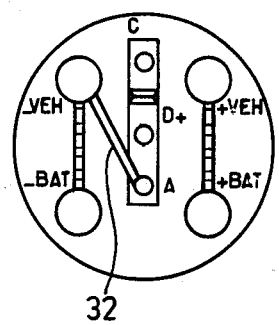
Figure 7:
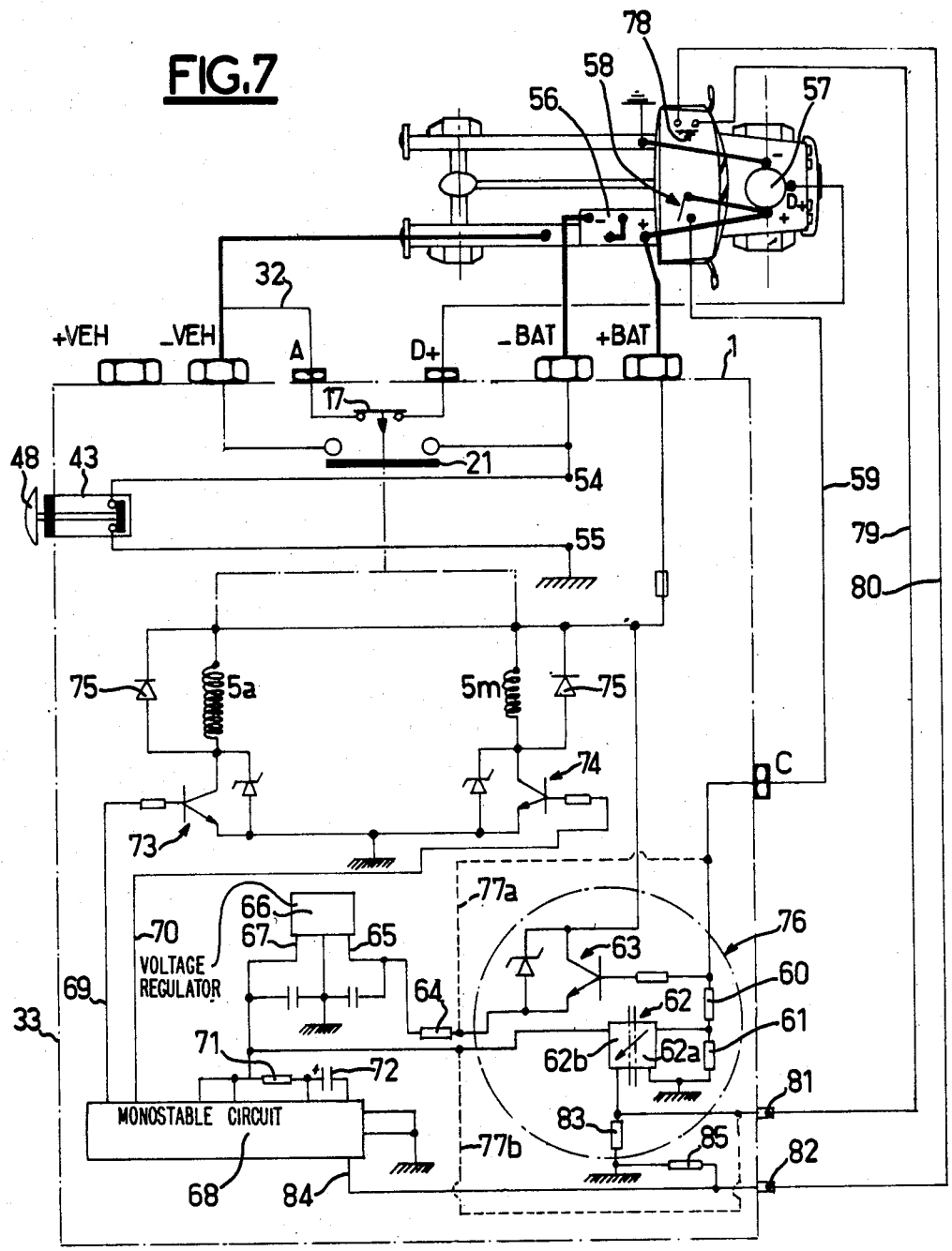

FIG. 5 is a fragmentary cross-section similar to FIG. 2 but depicting the case of adaptation of a mechanically locking emergency stop control, FIG. 6 is the circuit diagram of the electronic control in the case of control by ignition key, FIG. 7 represents this same electronic circuit diagram modified for simultaneous control by ignition key and push button, and FIGS. 8 to 10 are diagrams of the device seen from below and illustrating the external connections for various cases of use.

As illustrated in particular in FIGS. 1 to 4, the mechanical part of the device according to the invention includes an insulating base 1 on which is fixed, by means of screws 2, a support bracket 3 bearing the electromagnet 4. This magnet is formed by a winding 5, formed from a double winding, pull and hold, wound on a former 6 of insulating material, itself mounted in a magnetic circuit formed by a soft iron bracket 7 and a closing plate 8 bearing a fixed pole piece 9 riveted to that plate, while the ends of the magnetic bracket 7 are fixed in the support bracket 3 through the closing plate 8.

The electromagnet 4 is completed by a plunger core 10 sliding inside the former 6 and passing through an orifice 11 in the upper part of the magnetic bracket 7. This plunger core is integral with a shaft 12 of non-magnetic material which slides through the fixed pole piece 9 to drive the mechanism located in the insulating base 1 below the bracket 3.

On the threaded end 13 of this shaft 12 is screwed a shaft end-piece 14 the end of which slides in a centering bore 15 in the insulating base 1 and which carries, by means of an insulating sleeve 16, a central connecting piece 17 which can be formed by a simple copper washer.

Above the insulating sleeve 16, the shaft end-piece 14 carries a cross-piece 18 which includes a central orifice sliding over the shaft end-piece 14 and which is constantly pushed by a compression spring 19 against the insulating sleeve 16. In FIGS. 1 to 4 the device is represented in the position of normal vehicle operation, i.e. in the position in which the electromagnet 4 is excited, the plunger core 10 and the shaft 12 consequently being pulled towards the bottom. In the opposite movement, the moving assembly has its travel limited by a stop washer 20 fixed between the shaft 12 and the shaft end-piece 14.

The cross-piece 18 transversely carries at each of its ends a copper lateral connecting bar 21, the two bars 21 being insulated from each other and from the ground of the device. For this, as represented, each bar 21 can be fixed to the cross-piece 18 by means of a rivet 22 made of insulating material, for example polytetrafluoroethylene, which passes through both the bar 21 and the cross-piece 18, with the inclusion also of an insulating washer 23 between these two parts, a clamp-washer 24 holding each of the rivets 22 in place. Naturally, as a variant, it would be possible to use another arrangement by making the cross-piece 18 of insulating material.

Between the head 25 of each insulating rivet 22 and the insulating base 1 is interposed a return spring 26 for returning the moving assembly upwards until the stop washer 20 meets the support bracket 3.

Figure 1:
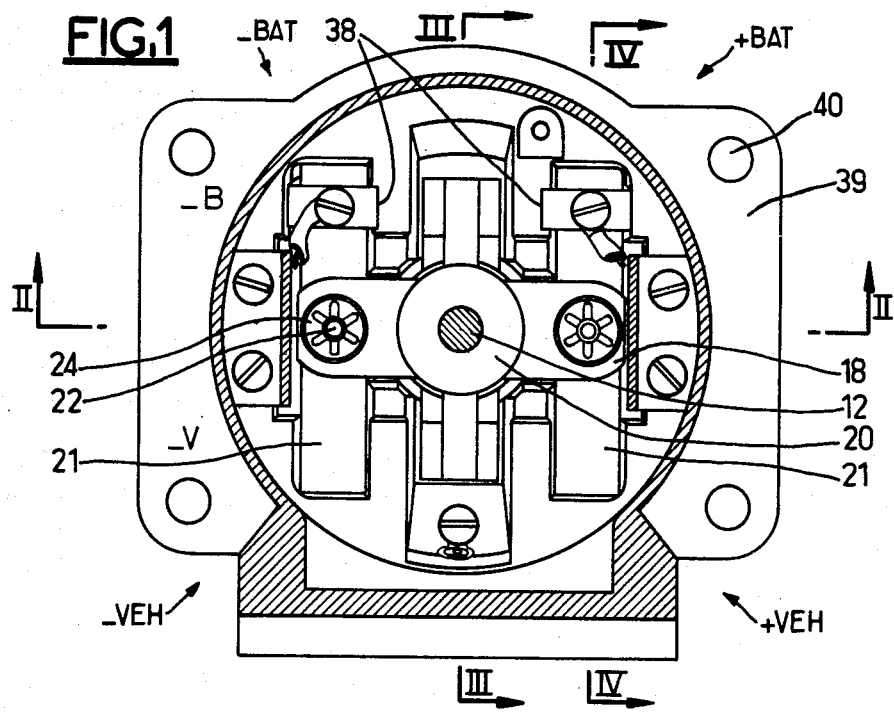
FIG. 1 is a horizontal cross-section along I—I of FIG. 2.

Each lateral connecting bar 21 is capable of contacting the upper ends of two terminals 27 in order to make an electrical bridge connection between them, the four terminal locations thus defined occupying approximately the four corners of a square. In order to distinguish them from each other, these four terminals or teminal locations are marked externally on the insulating base 1 with the following marks: −BAT, +BAT, −VEH and +VEH. These marks are indicated in FIG. 1, and in turned-over position in FIGS. 8, 9 and 10 which are bottom views, as they appear to the user when connecting them.

Depending on the applications, as will be seen later, one of the terminal locations is sometimes not used. To allow for this, the holes through which the terminals pass in the insulating base 1 are closed by a sealing cover 28 which is opened up in order to install the corresponding terminals 27, and which is left intact for the unused terminal location if necessary, the terminal 27 then being replaced by a simple stop piece 27a which serves as a support for the corresponding connecting bar 21 but does not serve as an electrical connection.

Figure 3:
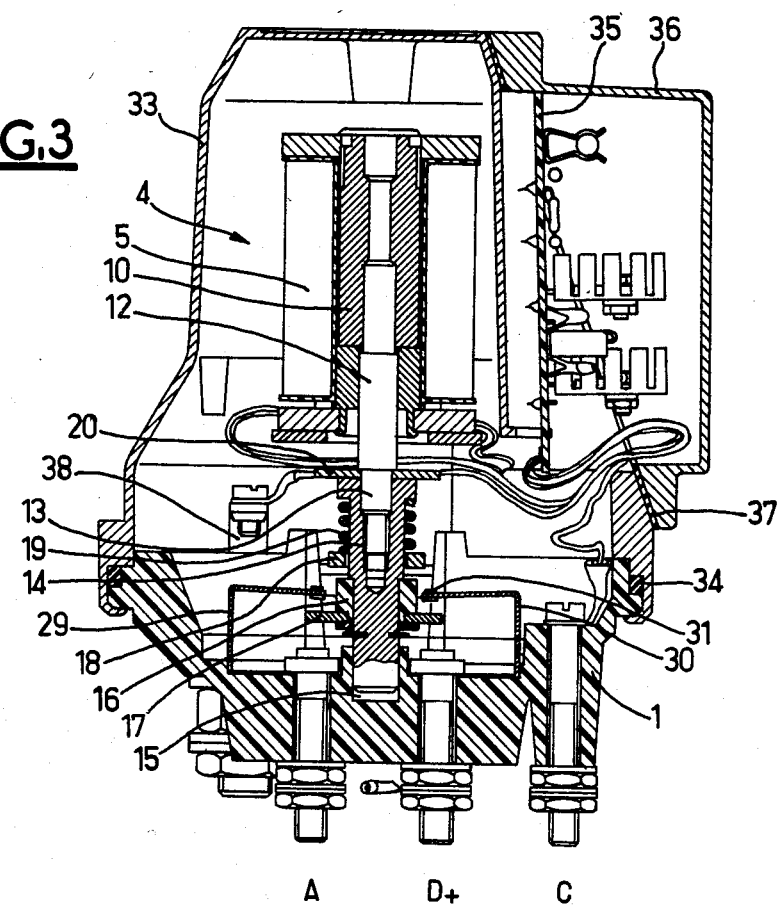
FIG. 3 is a vertical cross-section along III—III of FIG. 1.
Figure 4:
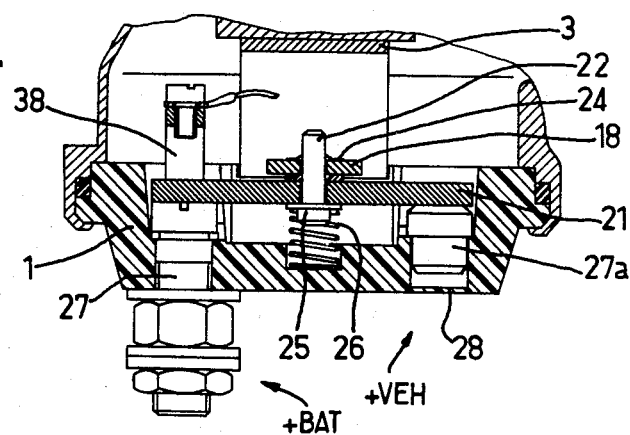
FIG. 4 is a fragmentary vertical cross-section along IV—IV of FIG. 1.

In the plane III—III of FIG. 3 are also arranged, in the insulating base 1, three terminals of smaller cross-section, marked C, D+ and A and visible in particular in FIG. 3 and FIGS. 8 to 10. The terminal C is used for connecting to the external control line, while terminals A and D+ are each internally connected to a pawl, 29 and 30 respectively, each having a riveted silver bead at its end, this bead coming into contact with the central connecting piece 17 described above.

In the case of vehicles having an alternator with incorporated regulator, the D+ terminal is connected to the D+ terminal of the alternator (with incorporated regulator), the A terminal being connected by an external shunt 32 to the −VEH terminal, and the pawls 29 and 30 and their silver beads 31 are made such that the circuit between them is closed by the piece 17, thus ensuring the grounding of the diodes of the regulator before the main circuit is broken by the connecting bars 21. This is the precontact technique that is illustrated in FIGS. 1 to 4 and the diagrams in FIGS. 6 and 7.

In the opposite case of vehicles including an alternator with a non-incorporated regulator, the pawls 29 and 30 are then modified so that they are lower and their silver beads 31 are located below the central connecting piece 17, in order to ensure the pre-switching off of the excitation of the alternator by opening the contact between the pawls before the opening of the main circuit takes place, the D+ terminal being in this case connected to the alternator excitation.

The entire structure that has just been described, and which is supported by the insulating base 1, is enclosed in a metal cover 33 crimped in a sealed way by means of a seal 34, the electronic circuit formed by a printed circuit board 35 being itself placed inside the cover 33 and closed by a lateral cover 36 normally connected in a sealed way with the cover 33 by means of a seal 37. The electronic circuit 35 is electrically connected to the control input C, to the double winding 5 of the electromagnet 4, as well as to the −BAT and +BAT teminals by means of connecting brackets 38 visible in FIGS. 1 to 4.

The main cover 33 includes at its base a horizontal flange 39 pierced with fixing holes 40 to enable fixing to the vehicle at the appropriate place. This cover 33 has at its upper end a thinned section 41 and two tapped holes 42 enabling, by removing the former and screwing into the latter, the fitting of the mechanically locking emergency stop control represented in FIG. 5.

This latter includes a body 43, which is fixed in a sealed way on the top of the cover 33 by means of screws 44 screwing into the holes 42 and a seal 45. In this body can slide in a sealed way, by means of a seal 46, a rod 47 terminated by a control knob 48 and including an internal two-position means of mechanical locking by means of two balls 49 pushed by a spring 50 into two grooves 51 in order to have two stable positions. The inner end 52 of the rod 47 operates on a contact blade 53 in the direction of opening the contact between terminals 54 and 55 that are interposed between the −BAT terminal and the ground of the electronic circuit, separate from that of the vehicle.

The electronic circuit 35 itself is represented in detail in FIG. 6 in which can be seen in particular the various connecting terminals and in which the emergency stop control has been assumed to be installed. At the top of the figure can be seen the vehicle with its battery 56, the − and + terminals of which are connected to the −BAT and +BAT terminals respectively. Also shown is the alternator 57, assumed to be of incorporated regulator type, and connected between the + of the battery and the vehicle ground. This alternator includes an additional regulation input D+ which is connected to the D+ terminal of the device. Also shown is the external shunt 32 connecting the −VEH and A terminals according to FIG. 8. Finally, the + terminal of the battery 56 or of the alternator 57 is connected by an ignition key 58 and a control line 59 to the control input C. The double winding 5 has been represented by separating the pull winding 5a from the hold winding 5m.

The whole of the device having been produced in a sealed way in order to be intrinsically safe, it is also necessary as explained above that in the case of transport of dangerous materials, the control line 59 should carry only a current of less than 20 mA. To achieve this, according to the invention, a divider bridge is used, formed from two resistors 60 and 61 fitted between C and ground, and feeding the transmitting section 62a of an optical coupler 62 the receiving section 62b of which activates a transistor and Zener diode amplifier 63. When this is activated, it transmits the battery voltage, via a resistor 64, to the input 65 of a voltage regulator 66, also connected to ground, and of which the main function is to supply at its output 67 a regulated voltage of +5 volts to a monostable circuit 68. The latter, when it receives its supply through 67 when the ignition key contact 58 is closed, puts its main output 69 to the high level and at the same time puts its secondary output 70 to the low level for a time determined by the resistor 71 and the capacitor 72. Then, when this time is completed, the monostable switches over spontaneously and sets its output 69 to the low level and its output 70 to the high level.

It is also seen on the circuit diagram of FIG. 6 that the main output 69 and the secondary output 70 supply the pull winding 5a and the hold winding 5m respectively via a pair of transistor amplifiers 73 and 74, respectively, each amplifier including a a protection Zener diode and, each winding 5a, 5m having a diode 75 in parallel for protection from break impulse currents.

It is therefore seen that on closure of the ignition key contact 58, the pull winding 5a is energized for a period of time that is sufficient for the electromagnet to come to the end of its travel and close the main −VEH, −BAT circuit, then, after this time, supply the hold winding 5m while switching out the winding 5a to prevent overheating of the device and excessive current consumption during the excited hold of the electromagnet, a state which continues throughout the operation of the vehicle. In reverse, when the contact 58 is opened, the optical coupler no longer controls the regulator 66, which no longer feeds the monostable 68, and consequently the de-energized electromagnet opens the main circuit with, as seen above, pre-contact or pre-switch off it necessary of the secondary circuit between A and D+.

It should be noted that this result is obtained with a control current in line 59 that is very much below the standard of 20 mA required for vehicles likely to transport dangerous materials. In the case, on the other hand, of a vehicle that is not intended for the transport of dangerous materials, one can simply omit from the printed circuit 35 the components included in the circle 76 on the circuit diagram of FIG. 6, and replace them with a simple shunt 77 connecting C to 64. One then obtains, with the same main component parts, a device that is intrinsically safe but not adapted for the transport of dangerous materials.

In the case of an emergency, the de-energizing of the electromagnet can also be obtained using the local control, of hit button type, which breaks the connection between the −BAT terminal and the ground of the electronic circuit where this local control has been fitted.

Certain manufacturers require that the battery cut-out control be provided not only directly by the ignition key but also by a push-button on the dashboard. In this case, the circuit diagram in FIG. 6 is modified in accordance with the circuit diagram in FIG. 7, in which the push button has been represented at 78 and is connected by two additional lines 79 and 80 to two additional input terminals 81 and 82. In this case, the voltage regulator 66 still has its input controlled by the transistor amplifier 63, but directly from the input C, without passing through the optical coupler. On the contrary, in this diagram this optical coupler is used to connect the regulated voltage output 67 to a resistor 83, setting up a voltage level which via terminal 81, line 79, push button 78, line 80, and terminal 82, ends up at a control input 84 of the monostable 68, which input is normally put at the low level by a depolarizing resistor 85. The advantage of this type of control is that, from the moment that this push button is released, no current flows in the control lines 79 and 80. This circuit diagram naturally corresponds to the transport of dangerous materials, and in the opposite case, one can again omit during manufacture all the components contained inside the circle 76 and replace them by two direct connection shunts 77a and 77b.

All of the above relates essentially to the most frequent case of heavy trucks, for which the break takes place between the −BAT and −VEH terminals, the case in which, as has been seen, it is the +VEH location that is occupied by the stop piece 27a (FIG. 4), the other three terminal locations being occupied by the normal terminals 27, and the external shunt 32 being connected between the −VEH and A terminals as is shown in FIG. 8.

There is a second case, which relates more particularly to buses, in which the break takes place between the +BAT and +VEH terminals, in which case it is the −VEH location that is occupied by the stop piece 27a, the other three locations being occupied by normal terminals 27, and the external shunt 32 being connected this time between the −BAT and A terminals, as is shown in FIG. 9.

Finally, there are rarer cases in which a two-pole battery cut-out is used, in which case the four terminal locations are occupied by the normal terminals 27, as shown in FIG. 10, the external shunt 32 then being connected as in the case of FIG. 8.

In short, we see that depending on the application, we can obtain:

1. A control by ignition key according to FIG. 6 or by push button according to FIG. 7, using a very slightly modified printed circuit using the same components and using two additional termainals 81 and 82;

2. A device satisfying the dangerous materials standards, or a standard device by omitting in this case the components included in the circle 76 replaced by one or two shunts;

3. A device without local control or with local control, by installing in this latter case the components represented in FIG. 5;

4. A device with pre-contact or pre-switch off of the auxiliary circuit, depending on the shape or bending given to the pawls 29 and 30; and finally, 5. A breaking of the main circuit on the negative, or on the positive, or even bipolar, using the wiring of FIGS. 8 to 10 respectively.

As these various cases can be combined with each other, there are therefore a total of 48 cases of different uses that can be satisfied with the same type of device, the various versions being obtained using the same essential components and varying from each other only in the wiring and in certain cases in the omission of units not used.

The invention thus enables the production of a universal equipment, of extremely high performance, perfectly adapted to all applications and extremely competitive because of single manufacturing.

As a variant, the optical coupler 62 could be split up into its two components and the transmitter 62a placed in the cab, which would do away with the electric control line 59 which would be replaced by an optical fiber transmitting light from 62a to 62b with further increased safety. In this case, 62a would for example by an infrared light emitting diode and 62b a photo-transistor.

We claim:

1. An electronically controlled battery electromagnetic cut-out unit for breaking a main electrical circuit and an auxiliary electrical circuit and being intrinsically safe, comprising a driving electromagnet having a pull winding, a hold winding, and a plunger core with a drive shaft; means for energizing the electromagnet to move the drive shaft in a first direction; an insulating intermediate member carried by the drive shaft; a central connecting member carried by the drive shaft for breaking the auxiliary circuit; a cross piece mounted on the drive shaft; a spring for urging the cross piece toward the intermediate member; a pair of lateral connecting bars; insulating means coupling the connecting bars to the cross piece; return springs for urging the connecting bars and the cross piece against the first direction movement of the drive shaft; means defining four terminal locations; the connecting bars in the energized state of the electromagnet being applied against the four terminal locations and in the deenergized state being urged away from the four terminal locations to provide main single to two-pole break control of the circuitry of the four terminal locations; control electronics including a voltage regulator, a control line for supplying voltage to the voltage regulator, a monostable multivibrator connected to the voltage regulator to be supplied therefrom, a first amplifier coupling a first output of the multivibrator to the pull winding, and a second amplifier coupling a second output of the multivibrator to the hold winding; and a sealed case enclosing the unit.

2. A unit according to claim 1 further including a low current control line for controlling the unit by means of an ignition key; and in which said control electronic further includes an optical coupler, and an amplifier for controlling the voltage regulator.

3. A unit according to claim 1 in which the control electronics further includes a third amplifier and an optical coupler in parallel with the third amplifier to transmit the regulated supply voltage from the regulator to a control input of the monostable multivibrator including a control push button.

4. A unit according to claim 1, further comprising a local cut-out control formed by a hit-type switch; mechanical locking means for locking the switch in either of two alternative positions; and circuit breaking means coupling the energizing means with the electronic circuit, so as to provide local emergency control of the deenergizing of the electromagnet.

5. A unit according to claim 1, in which the auxiliary circuit includes two terminals, said unit further comprising a pawl having a contact part located a short distance above the central connecting member so as to provide a pre-contact to ground the energizing means just before the breaking of the main circuit.

6. A unit according to claim 1, in which auxiliary circuit includes two terminals, said unit further comprising a pawl having contact parts arranged a short distance below the central connecting member so as to provide a pre-switch off of the energizing means.

7. A unit according to claim 1, further comprising an external shunt for connecting the input terminal of the auxiliary circuit to the energizing means, and a stop piece for replacing the unused normal terminal.

8. A unit according to claim 1, further comprising a base part of moulded insulating plastic material carrying all the electromechanical components and having holes through which terminals connected to the main circuit pass, and covering at least a portion of the holes, the cover being operable for the insertion of normal terminals.

* * * * *